INVENTOR.
Jacob Chass
BY
[signature]
ATTORNEY

INVENTOR.
Jacob Chass
BY
[signature]
ATTORNEY 2,841,744
Patented July 1, 1958

1

2,841,744

SYNCHRONIZED LOW FREQUENCY SAWTOOTH CURRENT WAVE GENERATING CIRCUITS

Jacob Chass, Camden, N. J., assignor to Radio Corporation of America, a corporation of Delaware Application July 8, 1955, Serial No. 520,775

6 Claims. (Cl. 315—27)

The invention relates to sawtooth wave generating circuits, and it particularly pertains to such circuit arrangements which are capable of developing sawtooth current waves of sufficient amplitude to drive the cathode ray beam deflection windings of television receivers in response to applied synchronizing pulses.

In present day television practice, the transmitted image is reproduced on the fluorescent screen of the face of the kinescope by intensity modulating an electron beam in accordance with the information signals and scanning the beam across the screen. The scanning is accomplished by deflecting the electron beam in two directions normal with respect to each other to form a raster. Deflection of the electron beam is accomplished magnetically, for example, by applying a sawtooth wave of current to the deflection system windings which are mounted in a mechanical yoke arranged about the neck of the kinescope. The electron beam traverses a line of the raster as the current flow in one deflection system is increased and the electron beam is more rapidly returned to the beginning of the next line as the flow of current is abruptly reversed in the one winding at the trailing edge of the sawtooth wave. The scanning of successive lines is performed under the control of the other sawtooth wave current flowing in the other deflection system winding. In the present television receivers commercially manufactured and sold, the sawtooth current waves are developed by first generating sawtooth voltage waves in one stage of the deflection generating circuitry and applying these sawtooth voltage waves to an amplifying stage for amplification to produce sawtooth current waves. The sawtooth current waves are then transferred by means of an output transformer to the deflection system windings.

An object of the invention is to provide a sawtooth current wave generating circuit providing a wave of magnitude sufficient to drive the deflection system winding of a kinescope in response to an applied train of synchronizing voltage pulses.

Another object of the invention is to provide a circuit arrangement employing a single electron discharge tube for producing sawtooth current waves of required magnitude in response to an applied train of synchronizing voltage pulses.

According to the invention sawtooth current waves are derived from a circuit arrangement in which a pentode electron discharge device is arranged with a path for highly regenerative feedback between the anode and screen grid electrodes for vigorous oscillation when the control electrode is at cathode potential and with a path for highly negative feedback between the anode and grid electrodes. The feedback path from the anode to control electrodes is given sufficient impedance so that the negative feedback will be eliminated as soon as the control electrode draws current due to effective short circuiting through the control-cathode electrode circuit. The anode-screen electrode feedback circuit will then operate to produce vigorous oscillation which will persist until the negative feedback to the control electrode is re-established. A charge storing device is connected between the anode and control electrodes to be charged to a value proportional to the peak value of anode voltage during the time the control electrode remains at cathode potential. The anode current is thereby caused to drop to essentially zero value until the various electrode voltages return to values favorable to anode current flow. When anode current does commence to flow again, the control grid will be at a negative voltage determined by the charge on the charge storing device so that the anode current will be lower than at the instant before oscillation began. The charge in the storing device will now leak off and the grid voltage will attempt to reach the anode potential so that the negative feedback loop functions much in the manner of a Miller-integrator. As the control electrode voltage rises, the anode current increases and the electron discharge device remains a linear degenerative amplifier until the anode current reaches a maximum, at which point the oscillatory cycle will be re-initiated. According to the invention, any inductance in the anode circuit exerts practically no influence on the trace portion of the generated current waveform but is useful for recycling the generator. The repetition rate, the linearity, the amplitude, and the length of time the electron discharge tube device will remain blocked are dependent upon the charge in the storing device and the time constant of the discharge path. Optimum stability and linearity are obtained when the product of the capacitance and the resistance and the ratio of the capacitance to the resistance are of proper proportion. Thus during the scanning interval the circuit arrangement according to the invention is a linear sawtooth current wave generator, while during the retrace interval the circuit arrangement is oscillatory. The discontinuity in the control electrode admittance characteristic at the current drawing point is utilized for switching the two conditions and negative feedback during the scanning interval serves to linearize the waveform.

In order that the practical aspects of the invention may be fully appreciated in the application to practice, an embodiment of the invention, given by way of example only, is described with reference to the accompanying drawing in which.

Figure 1:
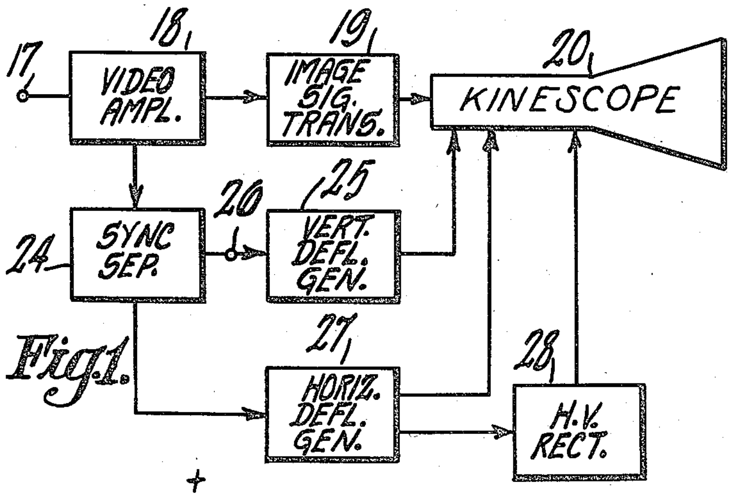
Fig. 1 is a functional diagram of a portion of a television receiver to which the sawtooth current wave generating circuit according to the invention is applicable.

A sawtooth current wave generating circuit according to the invention is particularly applicable for use in a television receiver or like apparatus, which may otherwise comprise circuits which might be entirely conventional and which will be described with reference to Fig. 1 to illustrate the setting of the invention. In such a receiver, television signals appearing at an antenna are applied to a radio frequency wave amplifying circuit and the output therefrom is applied along with a wave obtained from a local beat oscillation generating circuit to a frequency changing circuit. The output of the frequency changing circuit is applied to an intermediate frequency (I.-F.) amplifier which may be an individual picture I.-F. amplifying circuit or one amplifying both picture and sound signals. A demodulating circuit is coupled to the I.-F. amplifying circuit for deriving a video wave from the television signals. The detected video signals are applied at input terminals 17 of a video frequency (V.-F.) amplifying circuit 18 and the composite video signals are applied to an image signal translating circuit 19 for application to the input circuit of an image reproducing device, or kinescope 20. The image signal translating circuit 19 may consist of luminance and chrominance channels of a color television receiver or in the case of a black-and-white television receiver may comprise simple connections, with or without amplifications, between the video amplifier and the input circuit of the kinescope 20. Sound signals are derived from the frequency changing circuit, or from the I.-F. amplifying circuit, or from the demodulating circuit or from the video amplifying circuit 18 for further processing in a sound channel comprising an aural signal discriminating circuit, an audio frequency amplifying circuit and a transducer, usually in the form of a speaker. The output of the video amplifying circuit is also applied to a synchronizing pulse separating circuit 24 to separate the synchronizing pulses from the image information and to separate the vertical synchronizing pulses from the horizontal. The separated vertical synchronizing pulses are applied to a vertical deflection wave generating circuit 25 and horizontal synchronizing pulses are applied to a horizontal deflection wave generating circuit 27. A high voltage generating circuit 28 may be coupled as shown to the horizontal deflection generating circuit 27. The vertical deflection generating circuit 25, the horizontal deflection wave generating circuit 27 and the high voltage generating circuit 28 are coupled to the kinescope 20 to furnish the necessary vertical and horizontal deflection waves and high voltage potentials. A low voltage power supply, usually connected to the local alternating current (A.-C.) power line, is arranged to furnish direct energizing potentials to all circuits including the horizontal and vertical deflection wave generating circuits 25 and 27. Automatic gain control (A. G. C.) amplifying and distributing circuitry may be coupled to the synchronizing pulse separating circuit 24 or to the video frequency modulating circuit, or to the video frequency amplifying circuit 18 to supply control potentials to the desired ones of the circuits previously mentioned. Usually the R.-F. and the I.-F. circuits are at least so supplied.

The prior art arrangements for developing vertical deflection sawtooth current waves and horizontal deflection sawtooth current waves generally comprise a form of sawtooth voltage generator driving a sawtooth current integrating amplifying tube. Strictly speaking, the desired deflection current waveform is not that of a pure sawtooth but is best described as being "somewhat S-shaped," the precise waveform required being dependent upon the field distribution of the deflection winding and the curvature of the face plate of the kinescope. It will be convenient however to describe the invention in terms of a sawtooth wave since the desired wave is a close approximation of the ideal.

Figure 2:
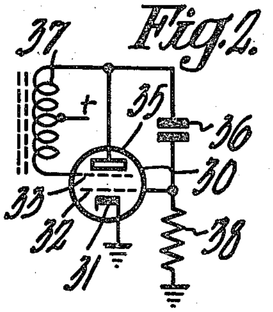
Fig. 2 is a basic schematic diagram useful in explanation of the operation of the sawtooth current wave generating circuit according to the invention.

Referring to Fig. 2 there is a schematic diagram of a basic circuit arrangement in which there is generated a sawtooth current wave in an impedance element which, during the trace interval, is essentially resistive. A multi-electrode discharge device is shown in the form of a tetrode vacuum tube 30 having a cathode electrode 31, a control electrode 32, a screen electrode 33 and an anode electrode 35. The tube 30 is arranged for highly regenerative feedback between the anode and screen electrodes sufficient for vigorous oscillation with the control electrode at cathode potential, and highly negative feedback between the anode and control electrodes. The negative feedback to the control electrode 32, when operative, is arranged to outweigh the positive feedback to the screen electrode 33 so that the circuit as a whole is degenerative with both feedback loops operative. A capacitive reactance element 36 connected between the anode electrode 35 and the control electrode 32 is given sufficient impedance, that is, made smaller, so that the negative feedback is eliminated as the control electrode draws current since the negative feedback path between the anode electrode 35 and the control electrode 32 is then short circuited by the control-cathode electrode circuit effectively forming a diode element. Feedback from the anode electrode 35 through the inductive reactance component of a winding portion 37 to the screen electrode 33 will then produce vigorous oscillation which will persist until the negative feedback to the control electrode 32 is re-established.

Figure 3:
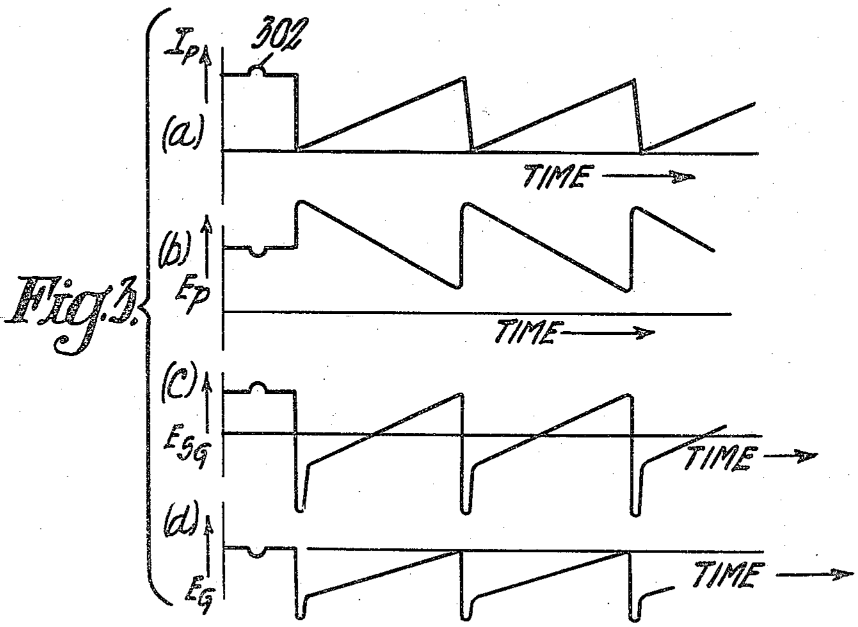
Fig. 3 is a graphical representation of waveforms appearing at various points in the circuit arrangement of Fig. 2.

At the beginning of the oscillation cycle the circuit may be considered as being in equilibrium and the control electrode 32 will be at the same potential as the cathode electrode 31 due to the control-to-cathode electrode resistance element 38. Any fluctuations of anode current tending to increase the current flow will cause the anode potential to drop whereupon the screen electrode potential will rise and the control electrode potential will drop. A graphical representation of these potentials is shown in Fig. 3, wherein Fig. 3(*a*) represents the anode current variations with time; the fluctuation of anode or plate current being shown by the curve portion 302; Fig. 3(*b*) is a representation of the change in anode potential with respect to time; Fig. 3(*c*) represents the change in screen potential with respect to time; and Fig. 3(*d*) depicts the change in control electrode potential with respect to time. The drop in potential of the control electrode will outweigh the rise in potential of the screen electrode and the net effect will be a drop in anode current, attempting to re-establish the previous steady state value. If a fluctuation occurs tending to decrease the anode current, potential at the anode will rise, the potential at the screen electrode will drop and the potential on the control electrode will remain at the potential of the cathode electrode since the diode element effected by the control-cathode electrode circuit will conduct. Therefore positive feedback is now effected and the anode electrode current will decrease even further and oscillation will commence. The anode current will rapidly drop to zero raising the anode electrode potential even higher. The capacitive reactance element 36 between the anode and control electrodes will charge to a value proportional to the peak value of potential at the anode electrode with the control electrode remaining at the same potential as the cathode electrode. As soon as the anode current goes to zero, magnetic energy will be transferred from the inductive reactance element 37 into the capacitive reactance element 36, and any stray capacity of the circuit, with a result that the anode electrode potential will commence to drop as soon as the anode current has reached a minimum. The potential of the screen electrode will rise while the control electrode potential will drop. Anode current will remain essentially zero until a combination of all these potentials readjust to permit anode current flow to recommence. However, when anode current flow recommences, the control electrode will not be at the same potential as the cathode electrode 31 but at a negative voltage determined by the charge that has been accumulated in the capacitive reactance element 36 so that the anode current will be much lower than at the instant before oscillation began. The charge on the capacitive reactance element 36 will now leak off and the control electrode will attempt, asymptotically, to attain the potential on the anode electrode so that the negative feedback loop is now functioning in the manner of a Miller integrator. As the potential of the control electrode rises, the anode current increases and the electron discharge device 30 remains a linear degenerative amplifier, amplifying the potential difference across the capacitive reactance element 36 until the control electrode current point is reached. At this point the anode current increases no further and the oscillatory cycle will be reinitiated. It is seen that inductive reactance in the anode circuit is required only for recycling and has practically no influence on the trace portion of the waveform, which portion is determined by a Miller integration process.

The charge accumulated in the capacitive reactance element 36 and the discharge resistance element 38 determine the length of time the discharge device 30 will remain blocked, the amplitude of the sawtooth current wave, effectiveness of the Miller integration process and thus the linearity, and the repetition rate. To accommodate all of these factors, it is necessary that both the product of the numerical values of the capacitive reactance element 36 and the resistance element 38 and the ratio of the values of the two elements are optimum for good stability and linearity.

Figure 4:
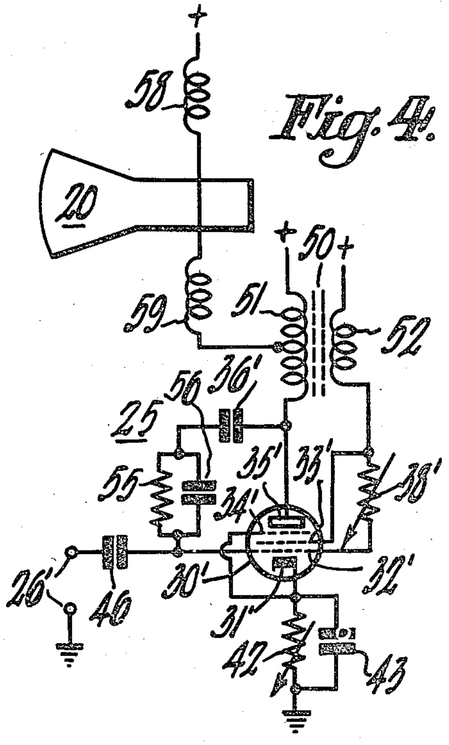
Fig. 4 is a schematic diagram of a practical sawtooth current wave generator according to the invention.

Referring to Fig. 4 there is shown a schematic diagram of a simplified circuit according to the invention for use as the vertical deflection wave generating circuit 25 of a television receiver. Primed reference numerals are employed to indicate the more directly corresponding components. A pentode vacuum tube 30' is used as the electron discharge device, which form has a suppressor grid 34' which is connected to the cathode 31' as well as the usual control grid 32' and screen grid 33. Grid bias is developed across a resistance element 42' in the cathode lead, which resistance element 42 is bypassed by a capacitor 43. Negative going synchronizing pulses to control the rate of repetition of the oscillations appearing at synchronizing input pulse terminals 26' are applied by a coupling capacitor 46 to the control grid 32'. The screen grid 33' is coupled to the anode 35' by the output transformer 50 comprising a tapped winding 51 and a secondary winding 52 poled so that the potential applied to the screen grid is of opposite polarity to that appearing at the anode 35'. The anode 35' is coupled by means of the charging capacitor 36' to the control grid 32' with a parallel resistance-capacitance network comprising a resistor 55 and a capacitor 56 interposed in the circuit in order to improve the linearity of the sawtooth wave. A vertical deflection winding comprising two sections 58, 59 is connected between a point of positive energizing potential and the tap on the winding 51 of the output transformer 50.

Figure 5:
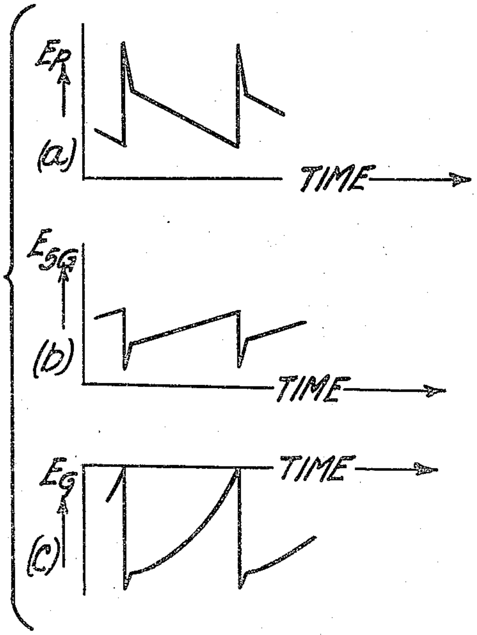
Fig. 5 is a graphical representation of waveforms observed in the operation of the circuit arrangement shown in Fig. 4.

The circuit arrangement shown in Fig. 4 operates much in the same manner as described for the arrangement of Fig. 2 as indicated by the waveforms shown in Fig. 5 which were observed in operation of the arrangement as shown in Fig. 4. Assuming that the charging capacitor 36' is charged so that the control grid 32' is negative, the charging capacitor 36' will be discharged through the resistance element 38'. The resulting change in the voltage on the control grid 32' causes the potential at the anode 35' to drop and the potential at the screen grid 33', coupled through the transformer 50 to the anode 35' to rise. Waveform on the control grid 32' which is shown in Fig. 5(*c*) is determined by the anode potential which is applied through the network from the anode 35' to the control grid 32' and by the asymptotic value of which the control grid 32' tends to achieve the rising voltage of the screen grid 33'. Switching is effected when the control grid 32' passes through zero voltage and begins to go positive. The control grid 32' is no longer influenced by the screen grid 33' because the resistance element 38' is quite large as compared to the internal resistance of the diode element formed by the control grid 32' and the cathode electrode 31'. The diode element formed by the grid 32' and the cathode 31' now becomes a source of electrons to form a negative charge on the charging capacitor 36'. When the control grid 32' begins to go negative the anode current drops and the potential at the anode 35' begins to rise, causing a sharp decrease in the potential of the screen grid 33'. A high positive pulse is then formed at the anode 35' which charges the charging capacitor 36' so that the control grid 32' and the screen grid 33' serve to block the pentode tube 30'. By adjusting the value of the cathode resistor 42' the amplitude of the sawtooth current wave or "size" is varied with a slight frequency change. The frequency, or "speed," of the oscillations may be varied by adjustment of the discharging resistance element 38'. The circuit arrangement shown in Fig. 4 produces a sawtooth wave having a relatively short retrace or return time so that very good interlacing of conventional television image reproduction is obtained.

Figure 6:
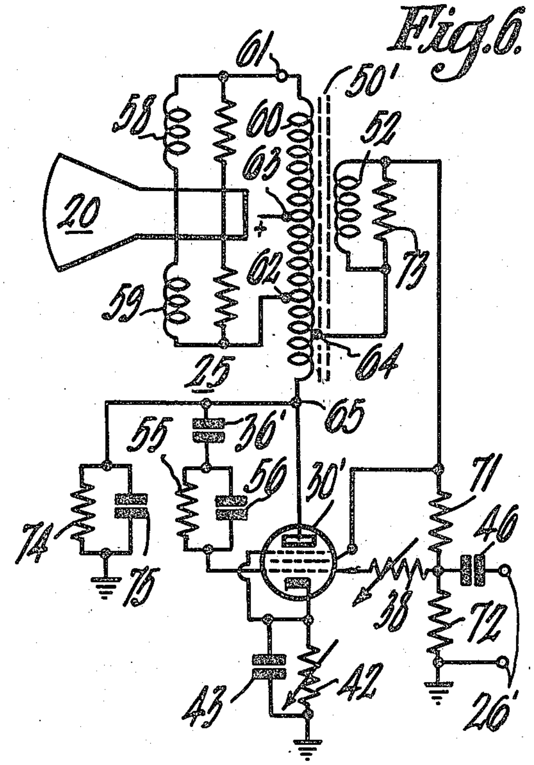
Fig. 6 is an alternate embodiment of a circuit arrangement according to the invention particularly meeting the deflection requirements for commercial television receivers.

In Fig. 6 there is shown a schematic diagram of a refined circuit arrangement for use with commercial home instrument television receivers. The vertical deflection winding sections 58, 59 are connected to the output winding 60 of the output transformer 50' between one end terminal 61 and a tap 62. Direct energizing potential is supplied at a tap 63 electrically midway between the terminal 61 and the tap 62 so that any horizontal deflection wave components which may be induced in the vertical deflection winding sections 58, 59 due to proximity in the mechanical yoke will traverse equal values of ampere turns in returning to ground through the energizing potential source. The horizontal components will be balanced out in the winding 60 so as not to effect the generation of vertical deflection waves in the vertical deflection wave generating circuit 25. The secondary winding 52 is returned to another tap 64 on the output winding 60 rather than the terminal 65 which is connected to the anode of the tube 30'. Resistors 71, 72 are added into the circuit to prevent interaction between the size control resistor 42 and the frequency control resistor 38'.

Those skilled in the art will determine from the teaching herein the proper values of the components to be used in applying the invention to practice, but the values listed below which were used in vertical deflection wave generators applying the circuits as illustrated by Figs. 4 and 6 and which gave completely satisfactory performance are suggested as a convenient guide.

| Ref. No. | Component | Type or Value |
|---|---|---|
| 30 | Pentode oscillator tube | 6K6. |
| 38 | Frequency control | 0–5 Mo. |
| 42 | Amplitude control | 0–2.5 ko. |
| 43 | Bypass capacitor | 100 mf. |
| 50 | Output transformer | XT-8626C. |
| 55 | Linearizing resistor | 250 ko. |
| 56 | Linearizing capacitor | 47 mmf. |
| 58, 59 | Vertical deflection winding | 60 o., 41 mh. |
| 71 | Isolating resistor | 2.2 Mo. |
| 72 | Isolating resistor | 2.7 Mo. |
| 73 | Modifying resistor | 1 meg. |
| 74 | Stabilizing resistor | 150 ko. |
| 75 | Stabilizing capacitor | 680 mmf. |

The power supply delivered 240 volts between the circuit points marked with the plus sign (+) and ground to provide a linear deflection current in excess of 550 milliamperes peak-to-peak with the tube running well within the manufacturer's ratings in every respect. The transformer was one having the proper turns ratio for optimum performance but should have had less iron in the core and more inductance in the anode winding for optimum performance. The reduction in the amount of iron will effect a corresponding reduction in manufacturing cost and weight of the television receiver.

The invention claimed is:

1. A sawtooth current wave generating circuit for operating one deflection system of a television receiver, including an electron discharge device having cathode, control screen and anode electrodes, a transformer comprising one winding having an intermediate tap and a terminal connected to the anode electrode of said electron discharge device and another winding, means to apply energizing potential between the other terminal on said one winding and said cathode electrode, a deflection system winding connected between said other terminal and the tap on said one winding, a capacitive reactance element having one terminal connected to the anode electrode and the other terminal coupled to the control electrode of said electron discharge device, connections between said one winding and the terminals of said other winding and the screen electrode of said electron discharge device to apply instantaneous potential to the screen electrode in opposition to the instantaneous potential at the anode electrode, a resistance element connected between the screen and control electrodes, and means to apply synchronizing voltage pulses to the control electrode of said electron discharge device.

2. A sawtooth current wave generating circuit for operating the vertical deflection system of a television receiver, including an electron discharge device having cathode, control screen and anode electrodes, a variable resistor having one terminal connected to the cathode electrode of said electron discharge device, a capacitor shunting said variable resistor, a transformer comprising one winding having two intermediate taps and a terminal connected to the anode electrode of said electron discharge device and another winding, means to apply energizing potential to said circuit between said one winding and said cathode electrode, a deflection system winding connected between said other terminal and a tap on said one winding, a capacitive reactance element having one terminal connected to the anode electrode and the other terminal connected to the control electrode of said electron discharge device through parallel connected capacitive and resistive components, connections between the remaining tap on said one winding and the terminals of said other winding and the screen electrode of said electron discharge device to apply instantaneous potential to the screen electrode in opposition to the instantaneous potential at the anode electrode, an adjustable resistor connected between the screen and control electrodes, and means to apply synchronizing voltage pulses between the control and cathode electrodes of said electron discharge device.

3. A sawtooth current wave generating circuit for operating the vertical deflection system of a television receiver, including an electron discharge device having cathode, control screen and anode electrodes, a variable resistor having one terminal connected to the cathode electrode of said electron discharge device, a transformer comprising one winding having two intermediate taps and a terminal connected to the anode electrode of said electron discharge device and another winding, a deflection system winding connected between said other terminal and one tap on said one winding, means to apply energizing potential between a point electrically centered with respect to said deflection winding and said cathode electrode, a capacitive reactance element having one terminal connected to the anode electrode and the other terminal connected to the control electrode of said electron discharge device through parallel connected capacitive and resistive components, a connection between the remaining tap on said one winding and one terminal of said other winding, a connection from the other terminal of said other winding and the screen electrode of said electron discharge device to apply instantaneous potential to the screen electrode in opposition to the instantaneous potential at the anode electrode, an adjustable resistor connected between the screen and control electrodes, a resistive element coupled between said adjustable resistor and the other terminal of said variable resistor, and means to apply synchronizing voltage pulses across said resistive element.

4. A sawtooth current wave generating circuit for operating the vertical deflection system of a television receiver, including an electron discharge device having cathode, control screen and anode electrodes, a variable resistor having one terminal connected to the cathode electrode of said electron discharge device, a capacitor shunting said variable resistor, a transformer comprising one winding having three intermediate taps and a terminal connected to the anode electrode of said electron discharge device and another winding, means to apply energizing potential between the tap on said one winding nearest the other terminal and said cathode electrode, a deflection system winding connected between said other terminal and the tap adjacent said one tap on said one winding, a capacitive reactance element having one terminal connected to the anode electrode and the other terminal connected to the control electrode of said electron discharge device through parallel connected capacitive and resistive components, a resistor and a capacitor shunted between the anode electrode and the other terminal of said variable resistor, connections between the remaining tap on said one winding and the terminals of said other winding and the screen electrode of said electron discharge device to apply instantaneous potential to the screen electrode in opposition to the instantaneous potential at the anode electrode, a resistance element and an adjustable resistor connected between the screen and control electrodes, a resistive element coupled between the junction of said resistance element and said adjustable resistor and the other terminal of said variable resistor, and means to apply synchronizing voltage pulses across said resistive element.

5. In a television receiver, the combination with a deflection circuit including a deflection winding, the operating cycle of said deflection circuit having a trace portion and a retrace portion, of a self-oscillating circuit including a single signal amplying device including an output electrode and a pair of control electrodes, means providing positive feedback from the output electrode to one of said control electrodes of said device and sustained oscillations of said oscillating circuit during the retrace portion of the deflection cycle, means providing negative feedback from the output electrode to the other of said control electrodes of said device and linear amplifier operation thereof during the trace portion of said deflection to provide output current from the output electrode of said device of a sawtooth waveform, and means for applying said current of sawtooth waveform to said deflection winding.

6. In a television receiver, the combination with a deflection circuit including a deflection winding, the operating cycle of said deflection circuit having a trace portion and a retrace portion, of a self-oscillating circuit including a single signal amplifying device having an anode, a cathode, and at least two grid electrodes, a resistor connected with one of said grid electrodes to provide an equilibrium condition and substantially the same voltage at said one of said grids and said cathode electrodes, means including an inductor providing a positive feedback path between said anode and the other of said grid electrodes to provide sustained oscillations of said oscillating circuit in response to variation in the anode current of said device during the retrace portion of the deflection cycle, means including a capacitor providing a negative feedback path between said anode and the other of said grid electrodes, said negative feedback path providing degenerative feedback between said anode and the other of said grid electrodes of a magnitude to provide linear amplifier operation of said device during the trace portion of the deflection cycle and anode current of said device of a sawtooth waveform, and means for applying said current of sawtooth waveform to said deflection winding.

References Cited in the file of this patent

UNITED STATES PATENTS

| | | |
|---|---|---|
| 2,602,896 | Whitaker | July 8, 1952 |
| 2,681,992 | Houghton | June 22, 1954 |
| 2,734,135 | Wagner | Feb. 7, 1956 |

FOREIGN PATENTS

| | | |
|---|---|---|
| 643,993 | Great Britain | Oct. 4, 1950 |